United States Patent [19]
Dowling et al.

[11] Patent Number: 5,608,988
[45] Date of Patent: Mar. 11, 1997

[54] METHOD OF TRAPPING FLIES AND FLY TRAP

[75] Inventors: Earl Dowling, Lacombe; Todd Hummelle, Ponoka, both of Canada

[73] Assignee: Allbrook Developments Ltd., Ponoka, Canada

[21] Appl. No.: 585,899

[22] Filed: Jan. 16, 1996

[51] Int. Cl.$^6$ .................................................. A01M 1/14
[52] U.S. Cl. .................................................. 43/114
[58] Field of Search ........................... 43/114, 115, 119, 43/121; D22/122

[56] References Cited

U.S. PATENT DOCUMENTS

| | | | |
|---|---|---|---|
| 418,803 | 1/1890 | Medford | 43/119 |
| 827,006 | 7/1906 | Gathmann et al. | 43/114 |
| 1,112,064 | 9/1914 | Gordon | 43/114 |
| 2,258,683 | 10/1941 | Ketterer | 43/114 |
| 3,685,199 | 8/1972 | Bradshaw | 43/114 |
| 4,829,702 | 5/1989 | Silvandersson | 43/114 |
| 5,022,179 | 6/1991 | Olson | 43/114 |
| 5,031,354 | 7/1991 | Olson | 43/114 |
| 5,239,771 | 8/1993 | Beardsley | 43/119 |
| 5,531,043 | 7/1996 | Shiboh | 43/121 |

FOREIGN PATENT DOCUMENTS 2058537  4/1981  United Kingdom ............ A01M 1/14

*Primary Examiner*—J. Elpel
*Attorney, Agent, or Firm*—Anthony R. Lambert

[57] ABSTRACT

A method and associated apparatus for trapping flies; with the method involving the following steps. Firstly, provide a tube which has an adhesive layer. Secondly, place the tube on a window sill with the adhesive layer positioned immediately adjacent to an interior surface of a pane of glass. A fly bouncing off the interior surface of the pane of glass adjacent the sill comes in contact with the adhesive layer and is held securely to the tube.

4 Claims, 2 Drawing Sheets

METHOD OF TRAPPING FLIES AND FLY TRAP

FIELD OF THE INVENTION

The present invention relates to a method of trapping flies, and a fly trap constructed in accordance with the teachings of the method.

BACKGROUND OF THE INVENTION

The simplest form of fly trap consists of a support structure with at least one surface having an adhesive coating. When flies come in contact with the adhesive coating, they stick. An example of such a fly trap is U.K. Patent Application 2,058,537 which was published Apr. 15, 1981. This reference discloses a elongate sheet with suitable adhesive on one face. The elongate sheet is intended to be hung in a room infested with flies. When a fly comes in contact with the adhesive it is held securely to the elongate sheet. The elongate sheet has a transverse hinge which enables the fly trap to be alternately configured or moved to a closed position.

The key to the effectiveness of fly traps, such as the U.K. Patent is the extent to which flies are prone to come in contact with the adhesive.

SUMMARY OF THE INVENTION

What is required is a method of trapping flies and associated fly trap with respect to which flies are more prone to come in contact with the adhesive.

According to a first aspect of the present invention there is provided a method of trapping flies. Firstly, provide a tube which has an adhesive layer. Secondly, place the tube on a window sill with the adhesive layer positioned immediately adjacent to an interior surface of a pane of glass. A fly bouncing off the interior surface of the pane of glass adjacent the sill comes in contact with the adhesive layer and is held securely to the tube.

This method was developed after close study of the propensities of flies. It was determined that a fly tends to head toward a window. The fly repeated flies into the pane of glass, dancing up and down the interior surface of the pane of glass in an attempt to escape. The fly descends down to the window before commencing its movement back up the interior surface of the pane of glass. It was, therefore, determined a fly trap positioned on the sill, immediately adjacent to the interior surface of the pane of glass, would be most effective. It is preferred that the tube be triangular in cross-section, as this enables the adhesive layer to be placed on one of the sides. The side is angled in relation to the interior surface of the pane of glass and the sill. This provides a good opportunity to catch the fly, whether it lands on the sill or merely bounces off the interior surface of the pane of glass adjacent the sill.

According to a second aspect of the present invention there is provided in combination, a window and a fly trap. The window has a sill and a pane of glass with an interior surface. The fly trap, as previously described, includes a tube having an adhesive layer. The tube is placed on the window sill with the adhesive layer positioned immediately adjacent to the interior surface of the pane of glass. A fly bouncing off the interior surface of the pane of glass adjacent the sill comes in contact with the adhesive layer and is held securely to the tube.

According to a third aspect of the present invention there is provided a fly trap including a tube having an adhesive layer. The adhesive layer is of sufficient strength that when a fly comes in contact with the adhesive layer it is held securely to the tube.

Although beneficial effects may be obtained through the use of the fly trap, as described above, it is desirable to be able to trap the fly whether it momentarily comes to rest on the window sill or merely bounces off the interior surface of the pane of glass immediately adjacent to the sill. Even more beneficial results may, therefore, be obtained when the tube is triangular in cross-section and has a first side, a second side and a third side. The adhesive layer is placed on the first side. This puts the adhesive layer at an angle in relation to both the interior surface of the pane of glass and the window sill.

Although beneficial results may be obtained through the use of the fly trap, as described above, in order to enjoy commercial success the fly trap must be convenient to handle. Even more beneficial results may, therefore, be obtained when the first side has a longitudinally extending centrally positioned fold line which divides the first side into two substantially equal halves. The first side is foldable along the fold line into a stored position with the two halves adhered together by the adhesive layer. This minimizes the space required when shipping or warehousing the fly trap. It also makes it convenient to dispose of. The two halves of the first side can be folded together, trapped flies and all, at the time of disposal.

Although beneficial results may be obtained through the use of the fly trap, as described above, it is important to maintain correct positioning of the fly trap in relation to the interior surface of the pane of glass. Even more beneficial results may, therefore, be obtained when the second side has at least one adhesive spot covered by a peel-off sheet. By removing the peel-off sheet to expose the at least one adhesive spot, the second side is adhered to a surface.

Although beneficial results may be obtained through the use of the fly trap, as described above, a home owner is always concerned about aesthetics. A fly trap will not be maintained in a household, no matter how effective it may be, if it is perceived to be an eye sore. Even more beneficial results may, therefore, be obtained when the third side has a decorative finish.

BRIEF DESCRIPTION OF THE DRAWINGS

These and other features of the invention will become more apparent from the following description in which reference is made to the appended drawings, wherein.

DETAILED DESCRIPTION OF THE PREFERRED EMBODIMENT

Figure 1:
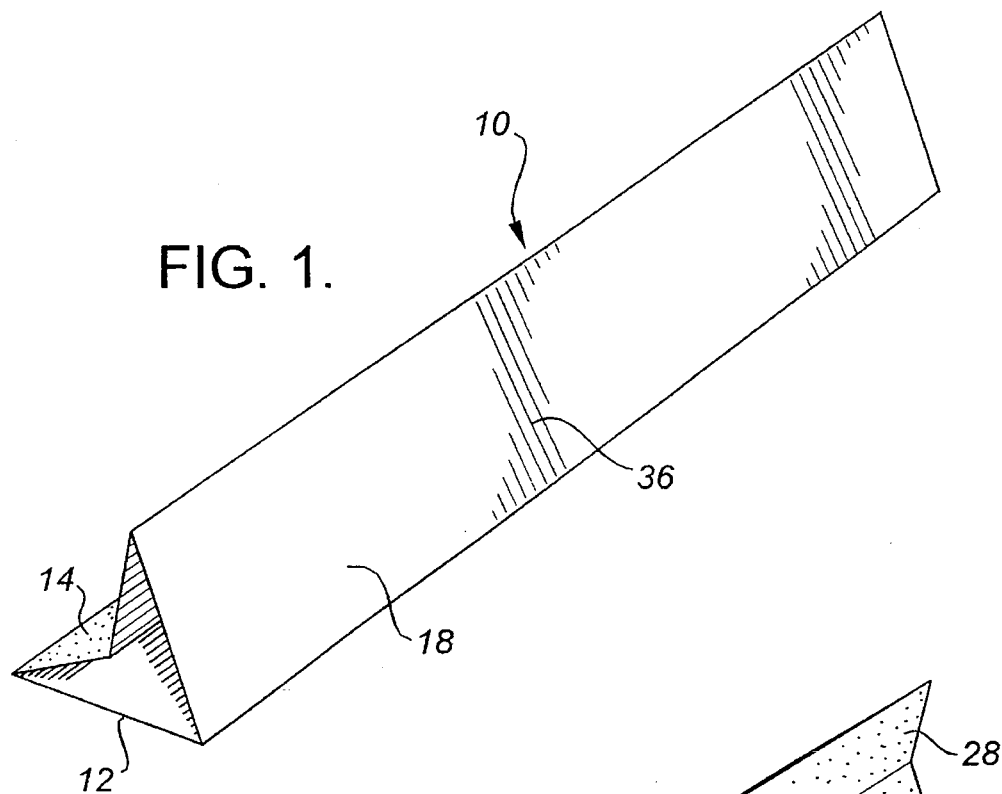
FIG. 1 is a perspective view from a third side of a fly trap constructed in accordance with the teachings of the present invention.

The preferred embodiment, a fly trap generally identified by reference numeral 10, will now be described with reference to FIG. 1 through 4.

Figure 2:
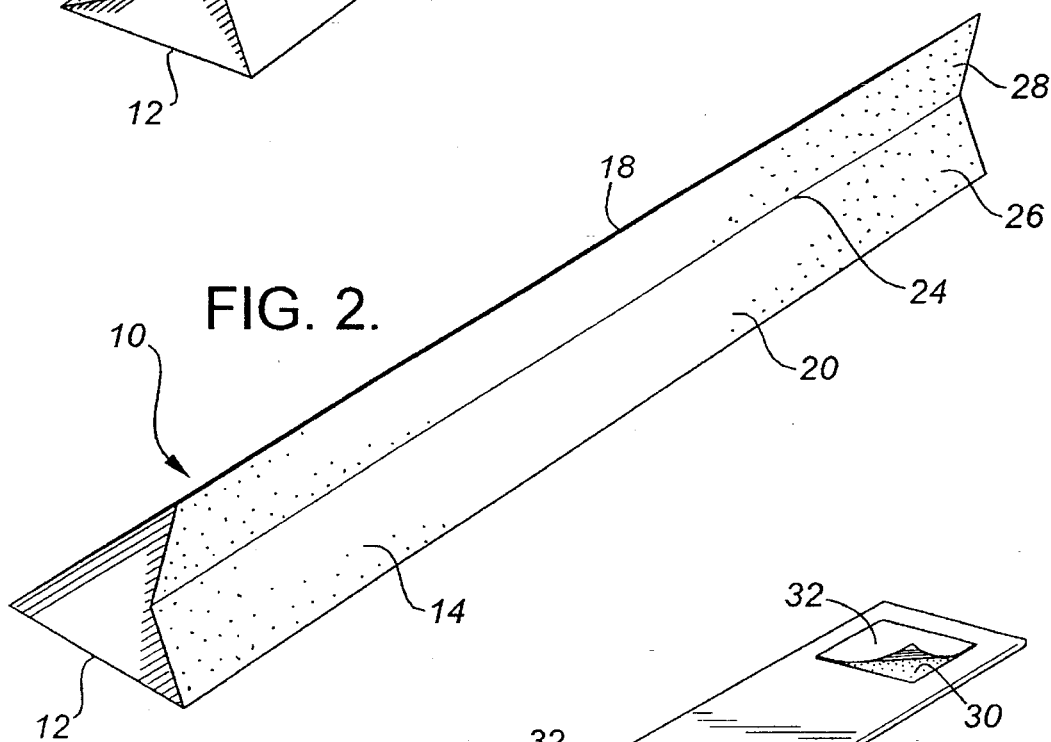
FIG. 2 is a perspective view from a first side of the fly trap illustrated in FIG. 1.
Figure 3:
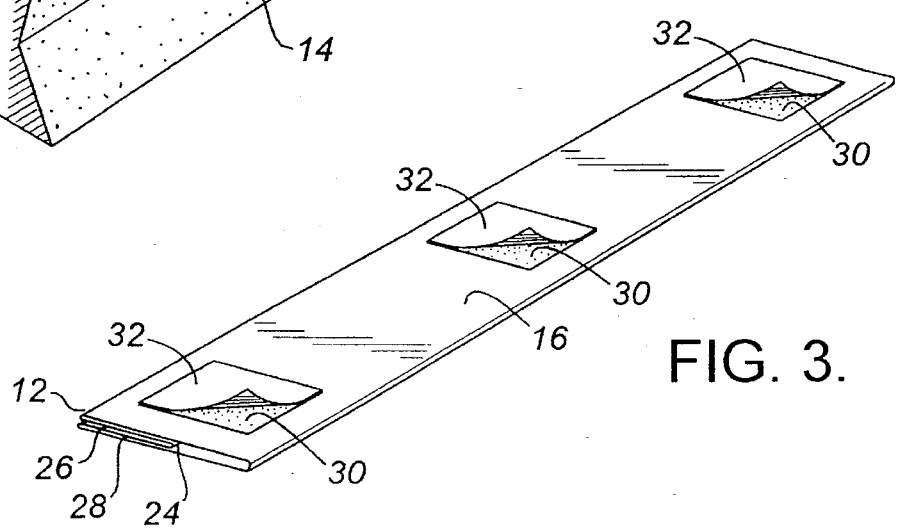
FIG. 3 is a perspective view from a second side of the fly trap illustrated in FIG. 1, the fly trap being in a closed position.
Figure 4:
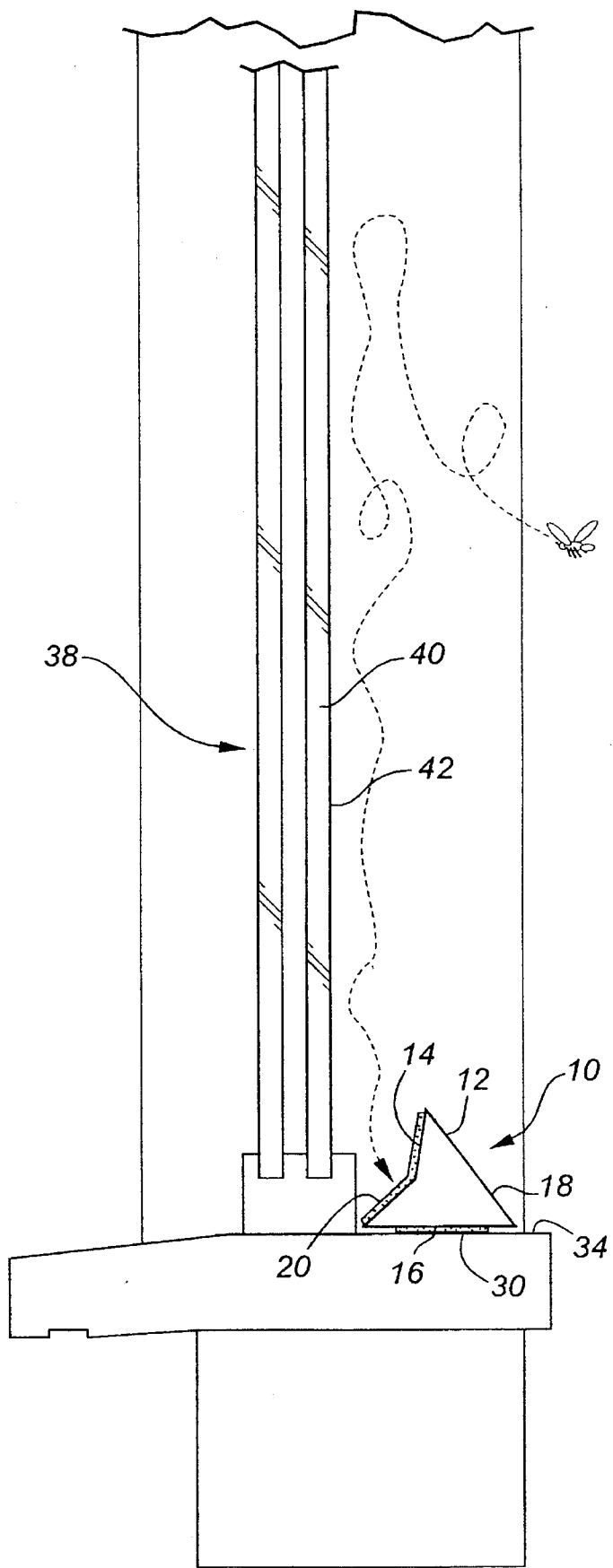
FIG. 4 is side elevation view in section, illustrating use of the fly trap illustrated in FIG. 1 in accordance with the preferred method.

Fly trap 10 includes a tube 12 which is generally triangular in cross-section. Tube 12 has a first side 14 illustrated in FIG. 2, a second side 16 illustrated in FIG. 3 and a third side 18 illustrated in FIG. 1. Referring to FIG. 2, first side 14 has an adhesive layer 20. Referring to FIG. 4, adhesive layer 20 is of sufficient strength that when a fly comes in contact with adhesive layer 20, the fly is held securely to first side 14. Referring to FIG. 1, first side 14 has a longitudinally extending centrally positioned fold line 24 which divides first side 14 into two substantially equal halves 26 and 28. Referring to FIG. 3, first side 14 is foldable along fold line 24 into a closed or stored position with halves 26 and 28 adhered together by adhesive layer 20. Second side 16 has a plurality of adhesive spots 30. Each of adhesive spots 30 is covered by a peel-off sheet 32. By removing peel-off sheets 32 to expose adhesive spots 30, second side 16 is adhered to a surface. Referring to FIG. 4, in accordance with the teachings of the method, which will hereinafter be described, the surface to which second side 16 is adhered is window sill 34. Referring to FIG. 1, third side 18 has a decorative finish 36.

The use and operation of fly trap 10 in accordance with the teachings of the preferred method will now be described with reference to FIGS. 1 through 4. Referring to FIG. 4, in the description which follows reference will be made to a window 38 having a sill (window sill 34) and a pane of glass 40 with an interior surface 42. When fly trap 10 is stored awaiting use, it is maintained in the position illustrated in FIG. 3 with halves 26 and 28 adhered together by adhesive layer 20. When it is time for use halves 26 and 28 are separated and side 14 is opened up to a substantially planar orientation, as illustrated in FIG. 4. Firstly, provide a tube 12; preferably a triangular tube substantially as described above, and illustrated in FIGS. 1 and 2. Secondly, place triangular tube 12 on window sill 34 with adhesive bearing first side 14 positioned immediately adjacent to interior surface 42 of pane of glass 40. To ensure that correct positioning is maintained, peel-off sheets 32 are removed to expose adhesive spots 30. Second side 16 is then adhered to window sill 34. Flies will be attracted to window 38. Flies will bounce off interior surface 42 of pane of glass 40 in an up and down pattern, rising toward the top of the window and then descending toward window sill 34. When a fly bounces off interior surface 42 of pane of glass 40 adjacent window sill 34, it will come in contact with adhesive layer 20 on first side 14 and will be held securely to triangular tube 12. During use the trapped flies are generally concealed from view by third side 18. Third side 18 has a decorative finish 36 which can be, of course, be made to suit any decor.

It will be apparent to one skilled in the art that modifications may be made to the illustrated embodiment without departing from the spirit and scope of the invention as hereinafter defined in the claims.

The embodiments of the invention in which an exclusive property or privilege is claimed are defined as follows:

1. A fly trap, comprising:

a tube having an adhesive layer, the adhesive layer being of sufficient strength that when a fly comes in contact with the adhesive layer it is held securely to the tube, the tube being triangular in cross-section and having a first side, a second side and a third side, the adhesive layer being on the first side, the first side has a longitudinally extending centrally positioned fold line which divides the first side into two substantially equal halves, such that the first side is foldable along the fold line into a stored position with the two halves adhered together by the adhesive layer.

2. The fly trap as defined in claim 1, wherein the second side has at least one adhesive spot covered by a peel-off sheet, such that by removing the peel-off sheet to expose the at least one adhesive spot, the second side may be adhered to a surface.

3. A fly trap, comprising:

a tube triangular in cross-section having a first side, a second side and a third side;

an adhesive layer on the first side, the adhesive layer being of sufficient strength that when a fly comes in contact with the adhesive layer it is held securely to the first side, the first side having a longitudinally extending centrally positioned fold line which divides the first side into two substantially equal halves, such that the first side is foldable along the fold line into a stored position with the two halves adhered together by the adhesive layer;

the second side having at least one adhesive spot covered by a peel-off sheet, such that by removing the peel-off sheet to expose the at least one adhesive spot, the second side is adhered to a surface; and the third side having a decorative finish.

4. A method of trapping flies, comprised of the steps of:

firstly, providing a tube which is triangular in cross-section having a first side, a second side and a third side, the first side having an outwardly facing exterior adhesive layer; and secondly, placing the triangular tube on a window sill with the adhesive bearing first side positioned immediately adjacent to an interior surface of a pane of glass, such that a fly bouncing off the interior surface of the pane of glass adjacent the sill comes in contact with the adhesive layer and is held securely to the first side.

* * * * *